Dec. 23, 1941.  E. H. STEEDMAN  2,266,915
LIFT FOR RAISING MOTOR VEHICLES
Filed Dec. 14, 1940  5 Sheets-Sheet 1

WITNESS:

INVENTOR
EDWIN H. STEEDMAN
BY
Roy M. Eilers
ATTORNEY

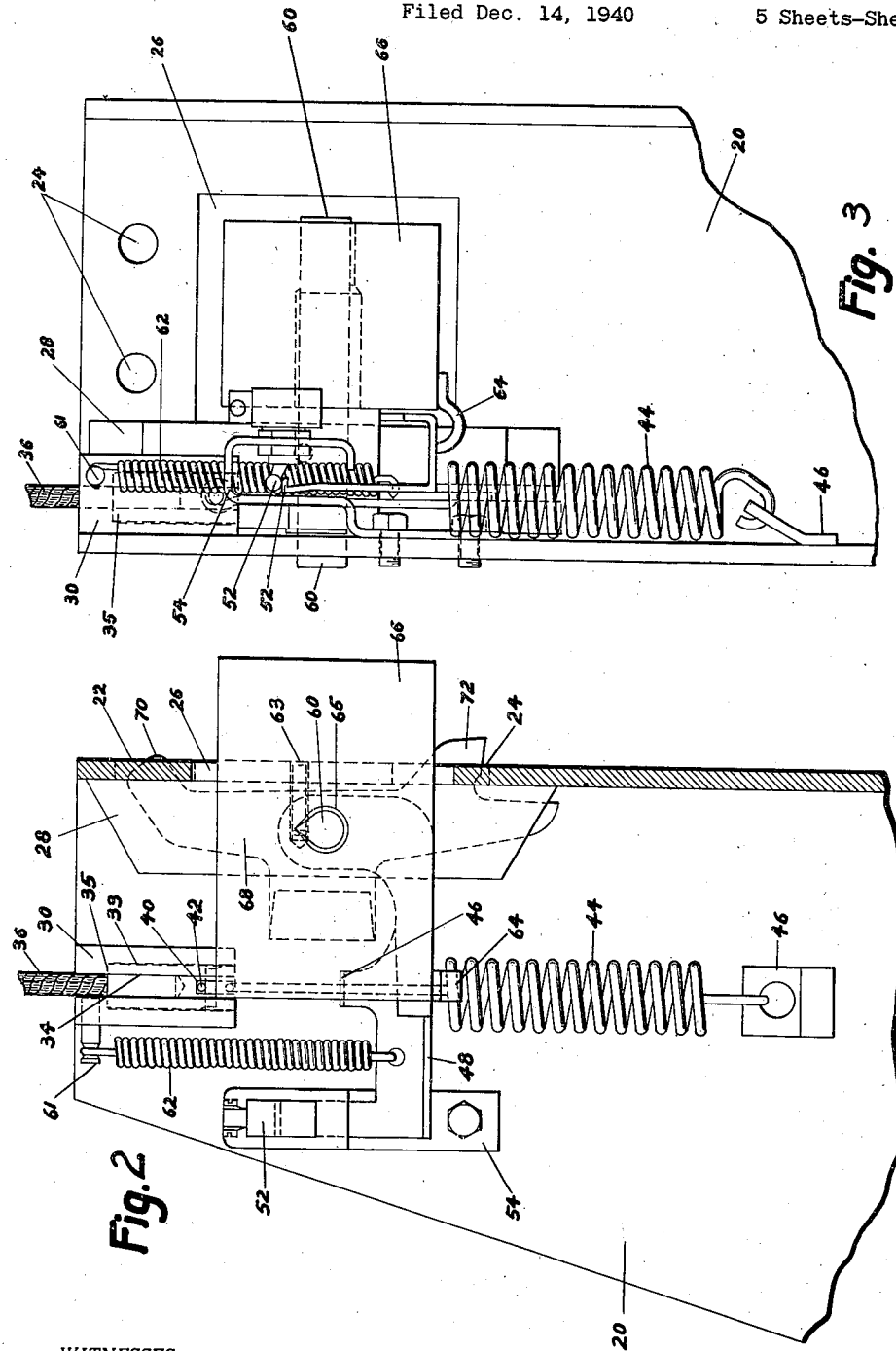

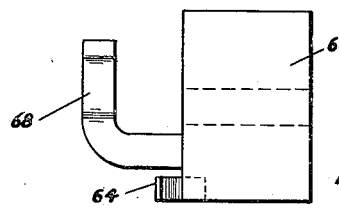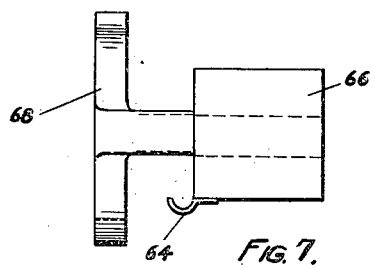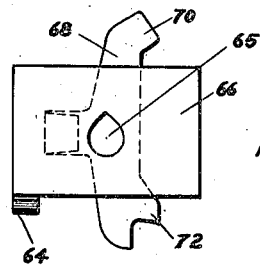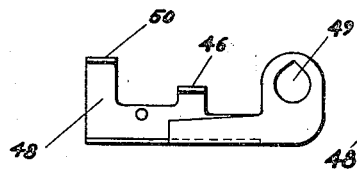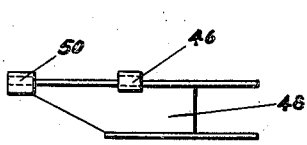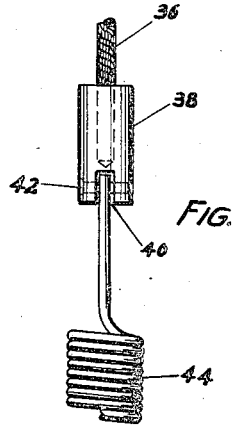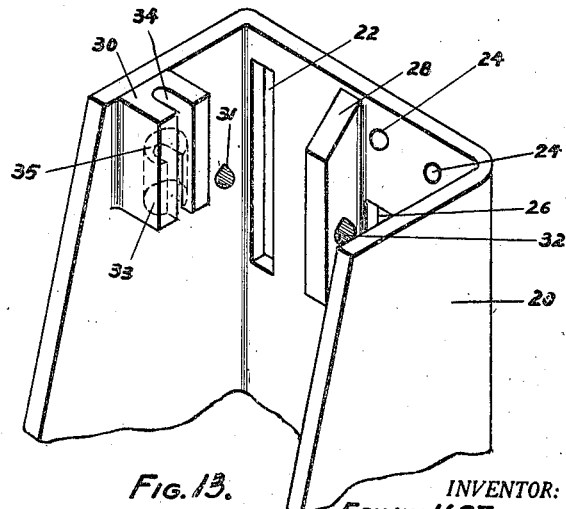

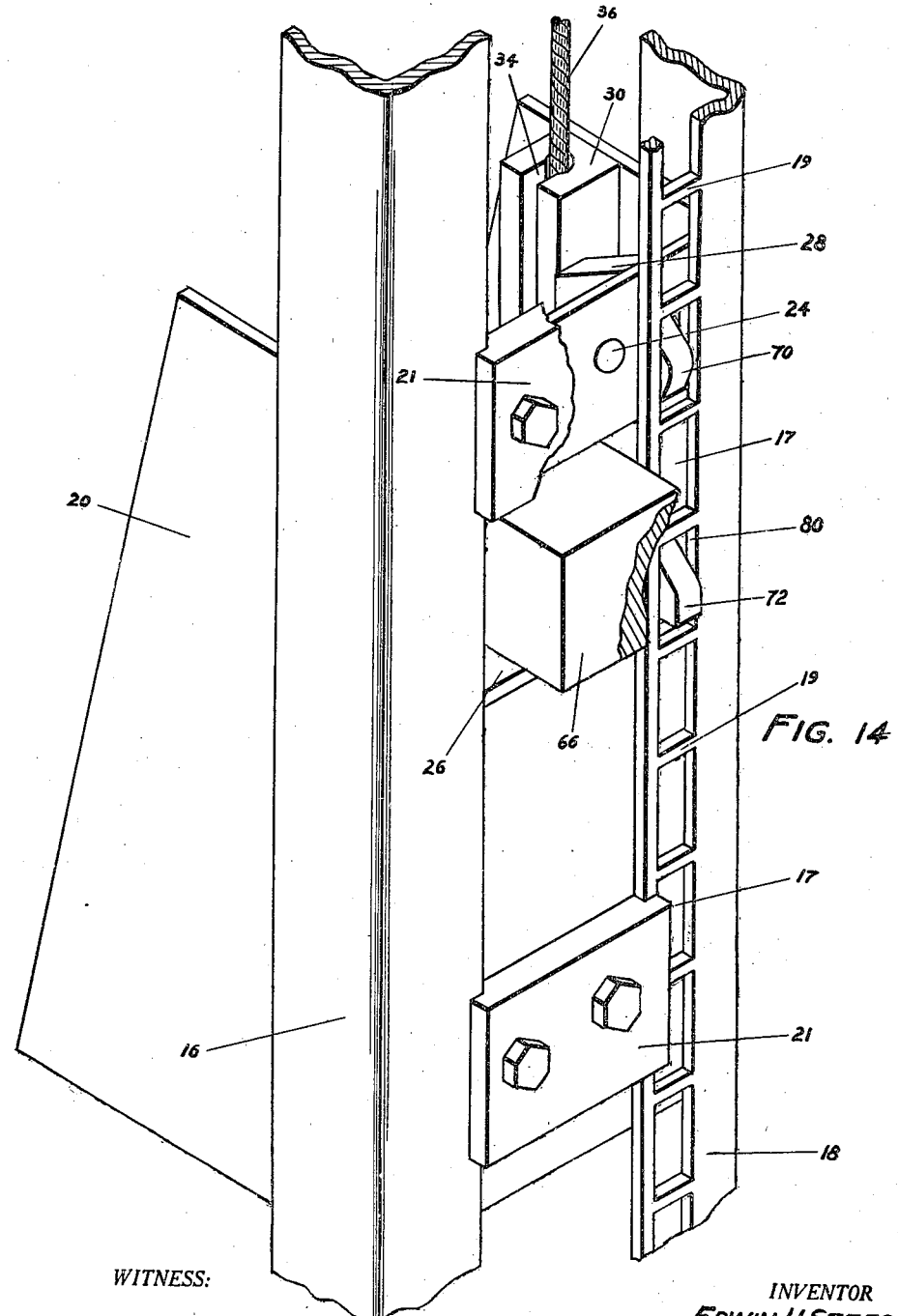

Dec. 23, 1941.  E. H. STEEDMAN  2,266,915
LIFT FOR RAISING MOTOR VEHICLES
Filed Dec. 14, 1940   5 Sheets-Sheet 5

WITNESSES:

INVENTOR:
EDWIN H. STEEDMAN
BY Roy M. Eilers
ATTORNEYS.

Patented Dec. 23, 1941

2,266,915

UNITED STATES PATENT OFFICE 2,266,915

LIFT FOR RAISING MOTOR VEHICLES

Edwin H. Steedman, St. Louis, Mo., assignor to Curtis Manufacturing Company, Wellston, Mo., a corporation of Missouri Application December 14, 1940, Serial No. 370,107

17 Claims. (Cl. 254—144)

This invention relates to improvements in lifts for raising motor vehicles. More particularly, the invention relates to improved safety mechanisms on lifts for raising motor vehicles.

It is an object of the present invention to provide safety mechanisms for lifts for raising motor vehicles.

Lifts for raising motor vehicles have been known and used for some time, and many of these lifts have had safety mechanisms incorporated in them. The object of these safety mechanisms is to prevent any dropping or tilting of the platform that would displace or drop the vehicle supported on the platform. These safety mechanisms operate well in a number of specific cases, but have not been found to be completely satisfactory in all cases. The invention provides an improved safety mechanism for mechanical lifts which positively locks the platform of the lift in a substantially horizontal position whenever a failure of any part of the lifting mechanism occurs. It is, therefore, an object of the present invention to provide an improved safety mechanism for lifts, which will positively lock the platform of the lift in a substantially horizontal position whenever any part of the lifting mechanism fails.

Of the various types of lifts that are used to raise motor vehicles, one of the more versatile types consists of a platform to support the vehicle, and four corner posts to guide the platform. The application of the invention to this type of lift is shown and described in the drawings and accompanying description. Since the mechanical parts of this type of lift may fail, it is necessary to provide a safety mechanism for the lift. Different types of safety mechanisms have been provided which operate to support the platform in the event of the failure of specified portions of the lifting mechanism. One such safety mechanism depends on frictional force to halt the movement of the platform in case of mechanical failure. Such a mechanism is satisfactory for some purposes, but cannot give immediate and positive protection against the dropping or tilting of the platform. Whenever a portion of the lifting mechanism fails, one side of the platform must drop a few inches before this safety mechanism operates to halt the movement of that portion of the platform. The dropping of one side of the platform can be a serious matter even though the one edge is only a few inches below the other. In such a case the platform is no longer level but is tilted. Where the platform is tilted, the vehicle that is supported thereon, may slide over to the low side of the platform. If the movement of the rest of the platform is suddenly halted while the platform is in the tilted position, the vehicle which slid over to the low side of the platform may drop off. If the movement of the rest of the platform is not halted promptly, the rest of the platform may be several inches above or below the portion that is halted. In such a case the tilt of the platform alone may be sufficient to cause the vehicle supported on the platform to slide or drop off. It can be seen, therefore, that a safety mechanism that permits the platform to tilt is quite objectionable. The invention obviates this objection by providing a safety mechanism for a lift that positively locks the platform in a substantially horizontal position, whenever a failure of any portion of the lifting mechanism occurs. It is, therefore, an object of the invention to provide a safety mechanism for a lift that positively locks the platform in a substantially horizontal position whenever a failure of any portion of the lifting mechanism occurs.

Four post lifts have been made that use four flexible cables to support the platform. The flexible cables that are used to support the platform may break or become slack, and it is necessary to support the platform whenever the cables break or become slack. It is necessary not only to support the platform whenever one or more of the cables break or become slack, but it is necessary to support the platform in a substantially horizontal position. It is, therefore, an object of the invention to provide a safety mechanism for the cable supported platform of a four post lift, that will support the platform in a substantially horizontal position whenever one or more cables break or become slack.

It sometimes happens that the downward movement of the platform of a lift becomes quite rapid. Where this is the case, the platform and vehicle that is supported thereon, may be injured when the platform strikes the ground. It is, therefore, necessary to halt the downward movement of the platform whenever the downward movement exceeds a predetermined rate of speed. It is equally necessary to halt the downward movement in such a manner, that the platform will be in a substantially horizontal position. It is, therefore, an object of the present invention to provide a safety mechanism for a lift, that will halt the downward movement of the platform whenever the downward movement of the platform exceeds a predetermined rate of speed, and will maintain the platform in a substantially horizontal position.

In the operation of four post lifts, one corner of the platform may bind with one of the posts, or the corner of the platform may hit an obstruction. This is usually the result of negligence on the part of the operator, in placing a rag on the guide portions of the platform, or leaving a grease can or bucket beneath the platform. Whenever this happens, the one corner of the platform stops moving, but the rest of the platform will continue to move. If the movement of the rest of the platform is not halted promptly, the platform will tilt. The tilting of the platform is objectionable since it may cause the vehicle supported on the platform to slide or drop off. The invention avoids this objection by providing a safety mechanism for a lift that will halt the movement of all portions of the platform, whenever the movement of any portion of the platform is halted. It is, therefore, an object of the present invention to provide a safety mechanism for a lift that will halt the movement of all portions of the platform, whenever the movement of any portion of the platform is halted.

Many of the safety mechanisms for lifts use a lever system that is actuable to move a locking member into locking position after a failure of a portion of the lift occurs. This type of safety mechanism is not completely satisfactory, because a failure of the mechanism that should move the locking member into the locking position would render the safety mechanism inoperative or would delay its actuation. This delay might result in such a dropping of a portion of the platform, that the platform would be dangerously tilted. Such tilting might result in the dropping of the vehicle supported on the platform and would, therefore, be quite objectionable. The invention obviates these objetcions by providing a safety mechanism that has a safety dog, which is positively forced into a stop-engaging attitude during the operation of the lift. Such a safety mechanism differs from former safety mechanisms by providing a safety dog that does not have to be moved into locking position after a failure occurs, since it is already in the locking position.

Other objects and advantages of the invention will appear from the drawings and accompanying description.

In the drawings and accompanying description, the adaptation of a preferred embodiment of the invention to a particular form of lift is shown and described, but the invention may be incorporated into any kind of mechanical lift. The invention is shown and described as applied to the one form of lift for the purposes of illustration only, and it is to be understood that the drawings and accompanying description do not limit the invention and that the invention will be defined by the appended claims.

In the drawings,

Fig. 2 is a side elevational view of the portion of the lift shown in Fig. 1.

Fig. 3 is an end elevational view of the portion of the lift shown in Fig. 2.

Fig. 4 is a side elevational view of a knife-edged pivot used in the safety mechanism for the lift.

Fig. 5 is an end elevational view of the knife-edged pivot shown in Fig. 4.

Fig. 6 is a plan view of a combination weight and safety dog used in the safety mechanism for the lift.

Fig. 7 is an end elevational view of the combination shown in Fig. 6.

Fig. 8 is a side elevational view of the combination shown in Fig. 6.

Fig. 9 is a side elevational view of the switch-actuating lever used in the safety mechanism for the lift.

Fig. 10 is an end elevational view of the lever shown in Fig. 9.

Fig. 11 is a plan view of the lever shown in Fig. 9.

Fig. 12 is a side elevational view of a portion of one of the cables used in the lift.

Fig. 13 is a perspective view of a portion of the platform guide in which the safety mechanism may be supported.

Fig. 14 is a perspective view of a corner post of a lift to which the invention is applied.

Figure 1:
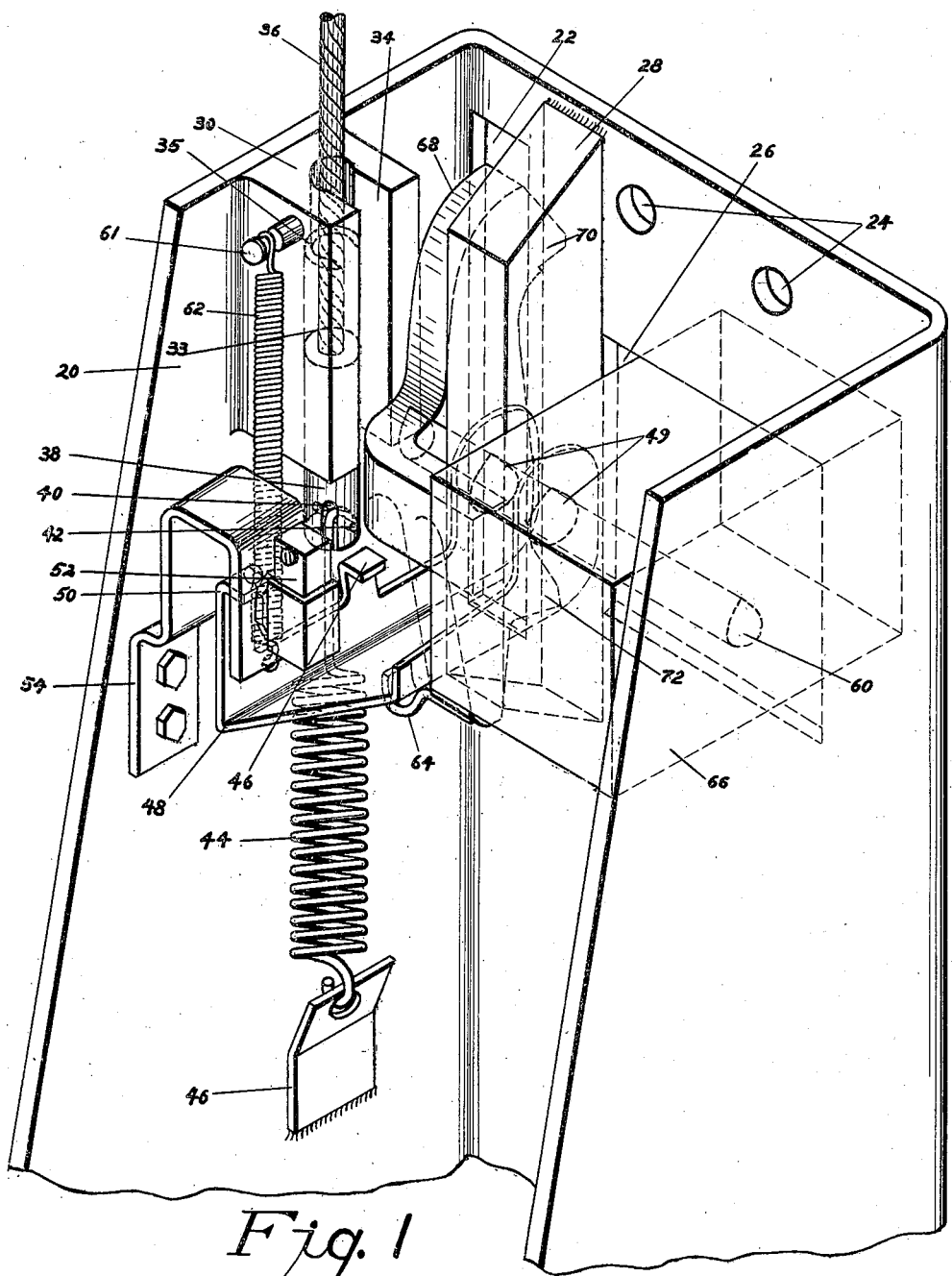
Fig. 1 is a perspective view of a portion of a lift in which the invention is incorporated.

Referring to the drawings in detail, a solid angle iron and an angle iron that has a number of perforations therein, are denoted respectively by the numerals 16 and 18. The perforations in angle iron 18 are separated from each other by stops 19, that are formed integrally with the angle iron 18. These angle irons 16 and 18 are secured to a top plate, not shown, and a base plate, not shown. The top plate and the base plate cooperate with the angle irons 16 and 18 to form a corner post for a lift. The lift may have a plurality of corner posts and will usually have four such posts. Each of these posts engages one corner of a platform on which a vehicle may be supported. Each of the corners of the platform has a platform guide 20 attached thereto which fits between the angle irons 16 and 18. The platform guides 20 are held in sliding engagement with the corner posts by members 21 that are bolted to the platform guides 20. One portion of the members 21 is wider than the space between the angle irons, and serves to maintain the platform guides 20 and the corner posts in assembled relation. The platform guides 20 are supported by cables 36 which are secured to the platform guides 20 and to rotatable drums carried by the platform guides. The cables engage sheaves that are rotatably secured to the corner posts and are supported thereby. The platform is raised and lowered by winding the cables onto and unwinding the cables off of the drums. The cables 36 are removably secured to platform guides 20 by their engagement with portions of the platform guides. Each of the platform guides 20 has a number of openings 22, 24, 26, and 31 therethrough, and has formed portions 28 and 30 on the inner surface thereof. Openings 24 receive bolts that secure members 21 to the platform guide 20. The formed portion 28 is a pivot support and it has a transverse hole 32 therethrough. The formed portion 30 is a cable-supporting member and it has a longitudinal slot 34 therein. The lower end of the member 30 is formed with a cylindrical cavity 33 and a shoulder 35 therein, which engage a cable anchor 38 that is secured to one end of cable 36. The cable 36 is secured at its other end to a rotatable drum, passes over a sheave rotatably secured to a corner post, and is maintained in assembled relation with the platform guide 20 by the engagement between the cable anchor 38 and the cable-supporting member 30. The cable anchor 38 has a slot 40 in one end that is bridged by a pin 42. This pin 42 engages a spring 44, that engages a bracket 46 on the inner surface of the platform guide 20. The spring 44 is under tension and tends to pull the cable anchor 38 downward. The engagement between the cable anchor 38 and the recess 33 in the cable-supporting member 30, is loose enough so that the cable anchor 38 may move longitudinally relative to the cable-supporting member. When the cable 36 is not under tension, the cable anchor is pulled downward by the spring 44. As the cable anchor 38 moves downward, it contacts a projection 46 on the switch-operating lever 48. This lever is pivotally secured to the platform guide 20 by the engagement of holes 49 in the lever, with a knife-edged pivot 60. The holes 49 in the switch-operating lever 48 are made somewhat larger than the cross-section of pivot 60 to permit movement of the lever 48 relative to the pivot. The knife-edged pivot 60 is supported in the transverse hole 32 in pivot support 28 and the hole 31 in the platform guide 20. A pin 63 positioned in the pivot support 28, engages the pivot 60 and prevents any translation thereof. The switch-actuating lever 48 is also attached to platform guide 20 by a spring 62, that tends to hold up the free end of the lever. The spring 62 that holds up the free end of lever 48, is in turn attached to the platform guide 20 by its engagement with a stud 61 mounted on projection 30. As the cable anchor 38 moves downward, it contacts projection 46 on the switch-operating lever 48 and forces the lever downward. The downward movement of the lever 48 moves projection 50 on the end of the lever 48 out of engagement with switch 52 that is secured to the platform guide 20 by a bracket 54. This switch is spring biased to the "off" position, and will move into the "off" position whenever the switch lever 48 moves out of engagement with it. Continued downward movement of the lever 48, will cause it to contact projection 64 on weight 66. Weight 66 is pivotally supported by the engagement between the hole 65 therethrough and the knife-edged pivot 60. The knife-edged pivot 60 that serves as a support for the switch operating lever 48, also serves as a support for the weight 66 and the safety dog 68 that is rigidly secured to the weight 66. The hole 65 in the weight 66 is slightly larger than the cross-section of the pivot 60 and permits movement of the weight 66 relative to the pivot 60. A safety dog 68 is secured to and movable with weight 66, and has two projections 70 and 72 thereon that extend through the opening 22 in the platform guide 20. The projections 70 and 72 also extend into the perforations 17 in the angle iron 18. The end of weight 66 extends through the opening 26 in the platform guide 20 and extends into the open space between the angle irons 16 and 18. Where desired, the weight 66 may be dispensed with, if the safety dog is designed to have the characteristic weight and balance that the combination weight and safety dog has.

Figure 15:
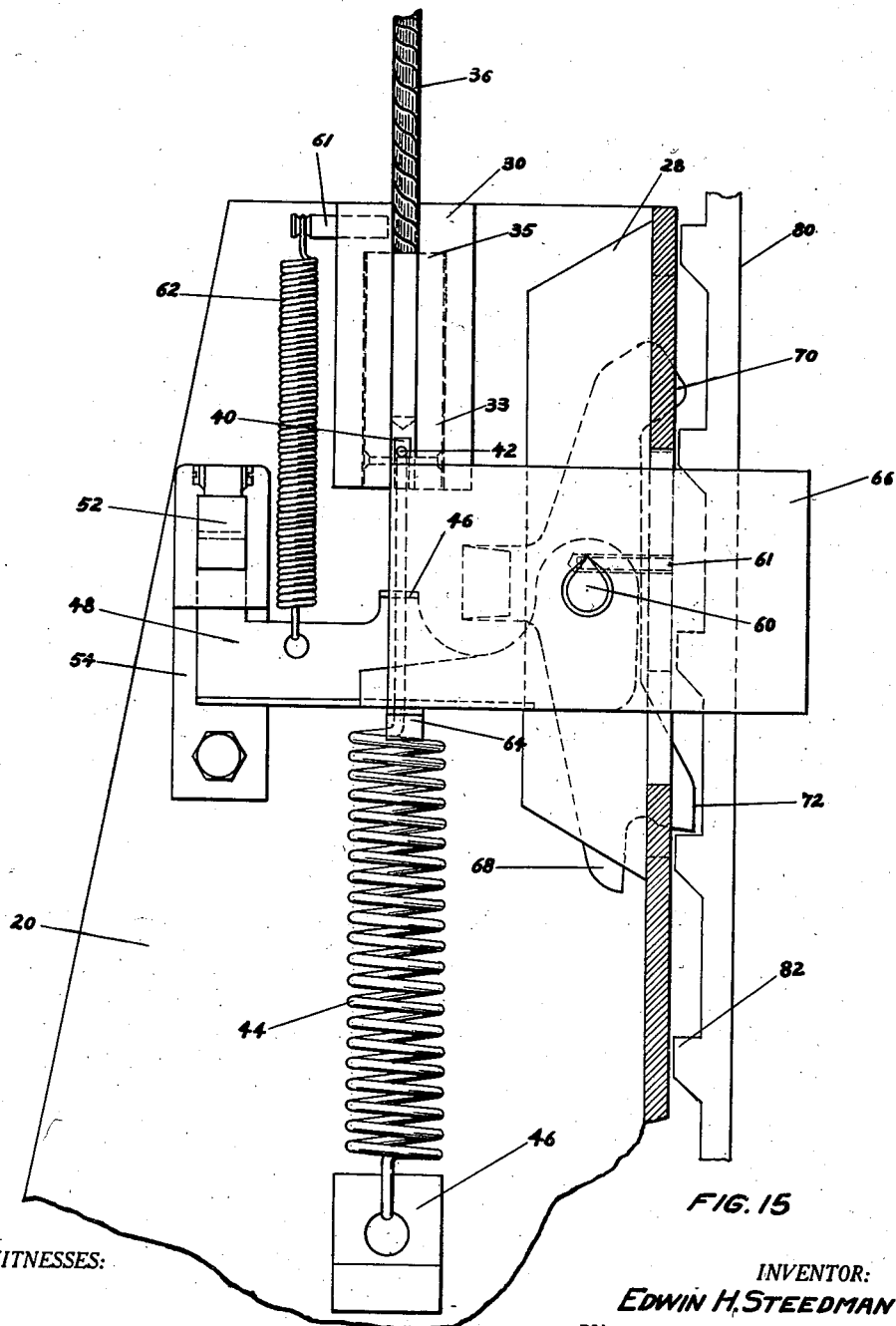
Fig. 15 is a side elevational view of a portion of the lift and shows an optional form of corner post.

An optional form of corner post is shown in Fig. 15. This post consists of a vertical member 80 having stops 82 thereon. The vertical member 80 also has a top plate and a bottom plate, not shown. The stops 82 perform the same function that the stops 19 in angle iron 18 perform. Although only two forms of corner posts have been shown, it is obvious to those skilled in the art that any form of corner post may be used which has a number of properly spaced stops.

Under normal operating conditions, the cable 36 is under tension and the cable anchor 38 engages the shoulder 35 at the upper end of the cylindrical cavity 33 in the cable-supporting member 30. When the cable anchor 38 is in this position, it is not in engagement with the switch-actuating lever 48. This lever is pulled upward by the spring 62 and engages the toggle lever of switch 52. The engagement of the switch-actuating lever 48 with the toggle lever of switch 52 under the influence of spring 62, maintains the switch in the "on" position. The upward movement of switch-actuating lever 48 moves the lever out of engagement with the projection 64 on weight 66. This permits the free oscillation of the combination weight and safety dog.

The operation of the safety mechanism is quite simple. The projections 70 and 72 on the safety dog 68 are dimensioned, so that only one of the projections 70 and 72 can operatively occupy one of the spaces between the stops 19 of the corner post at any particular instant. In addition, the projections 70 and 72 and the distances between the stops 19 are dimensioned, so that after one projection has been moved out of engagement with its stop 19, the platform guide 20 can move a short distance before the other projection engages the edge of one of the stops 19, and starts to move the first projection into the stop-engaging attitude. As the platform guide moves upward, the inclined top surface of the lower projection 72 will engage the lower edge of one of the stops 19 and cause the safety dog 68 to move in a clockwise direction. This clockwise movement of the safety dog 68 moves the lower projection 72 out of the stop-engaging attitude. The movement of the lower projection 72 out of the stop-engaging attitude, permits the unrestricted upward movement of the platform guide 20. As the platform guide continues to move upward, the outwardly and downwardly inclined top surface of the upper projection 70 will engage the lower portion of one of the stops 19, and will cause the safety dog to move in a counter-clockwise direction. This counter-clockwise movement of the safety dog 68 moves upper projection 70 inwardly thereby permitting unrestricted upward movement of the platform guide 20. As the platform guide 20 continues to move upward, the safety dog 68 and the weight 66 that is rigidly secured to the safety dog, will rock back and forth in such a manner that no restriction is placed on the upward movement of the platform guide 20. When the platform guide moves downward, the safety dog 68 and the weight 66 will again oscillate. As the platform guide moves downward, the inclined bottom surface on the upper projection 70 will engage the upper edge of one of the stops 19, and cause the safety dog 68 to move in a counter-clockwise direction. Such movement will move the lower projection 72 into the stop-engaging attitude. The bottom surface of the lower projection 72 is formed as a stop and will halt the downward movement of the platform guide if it engages the upper edge of any of the stops 19 on the corner post. The lower surface of the projection 72 is preferably a plane surface that is oblique to the plane of the corner post. Such a construction is helpful in locking the projection 72 with a stop 19. The inclined surface on the under side of the projection 72 will act as an inclined plane and tend to force the projection into secure engagement with stop 19. Such an arrangement prevents excessive wear of the edges of the stops 19, and securely locks the platform guide to the lift. It can be seen, therefore, that if the lower surface of projection 72 is not moved out of the stop-engaging attitude and is permitted to engage the upper edge of any one of the stops 19, the platform guide will be locked positively to the corner post. Some means must, therefore, be provided to cause the escapement member 68 to move in a clockwise direction to move the lower projection 72 out of the stop-engaging attitude, and thereby prevent the engagement of the projection 72 with the stop 19. Such a means is the combination safety dog and weight provided by the invention. The center of gravity of the combination safety dog 68 and weight 66 is located a short distance to the right of the center of oscillation of the combination. Such a design causes the combination weight and safety dog to move in a clockwise direction in response to gravitational pull. Such movement would rock the projection 72 out of the stop-engaging attitude and thereby prevent the engagement of the projection with the upper edges of stops 19 on angle iron 18, and permit unrestricted downward movement of the platform guide 20. The center of gravity of the combination is preferably located only a short distance from the hole 65, so that the movement of the combination in response to gravitational pull will not be rapid. This construction permits the safety dog 68 to move the projection 72 out of the stop-engaging attitude only when the movement of the platform is normal.

The safety mechanism provided by the invention, is arranged to stop the operation of the lift whenever a failure of any part of the lifting mechanism occurs. The halting of the operation of the lift whenever a failure of a portion of the lift occurs, maintains the platform in a substantially horizontal position. This is necessary to prevent the dropping of the vehicle supported on the platform, and is accomplished by breaking the electrical circuit of the lift. A number of means may be used to break the electrical circuit of the lift, and the simplest is the connecting all of the switches 52 in series relation with the driving means. If any of the swtches 52 was turned "off," the circuit would be broken and the platform would stop immediately. This would maintain the platform in a substantially horizontal position. This means is not completely satisfactory since it necessitates the provision of switches at each of the four corners of the lift which can break relatively high voltages. A preferred means of control, contemplates the provision of a pilot circuit operated on relatively low voltage to actuate a relay or other suitable device that completes the electrical circuit of the driving means. The pilot circuit places the four low voltage switches carried by the four platform guides, in series relation with the relay that completes the electrical circuit of the driving means. With this arrangement, the turning off of any of the switches 52 in the relatively low voltage pilot circuit will immediately open the relatively high voltage circuit of the driving means, thereby halting the operation of the driving means. This maintains the platform in a sustantially horizontal positon whenever the safety mechanism is actuated.

In case one or more of the cables break or become slack, the safety mechanism will operate to halt the downward movement of the platform guide 20 and maintain the platform in a substantially horizontal position. When a cable breaks or becomes slack, it is no longer under tension, and will permit the cable anchor 38 to move downward under the influence of spring 44. This spring is quite strong and will pull the cable anchor 38 down quite rapidly. As the cable anchor moves downward, it will engage projection 46 on the switch-operating lever 48 and move the lever downward. This downward movement of the switch-actuating lever 48 will permit the switch 52 to move into the "off" position and thereby halt the operation of the driving means. The halting of the operation of the driving means will effectively prevent the tilting of the platform, since the operation of the driving means is halted before the projection 72 is locked in engagement with one of the stops 19. Further downward movement of lever 48 will bring it into engagement with projection 64 on weight 66 and will cause the combination weight and safety dog to move and thereby lock projection 72 in engagement with one of the stops 19. Such locking will immediately and positively halt the downward movement of the platform guide. Such an arrangement prevents any movement of any of the platform guides after a cable breaks, and thereby keeps the platform level.

If the downward movement of the platform exceeds a predetermined rate of speed, the safety mechanism will operate to halt the platform in a substantially horizontal position. As the platform moves downward, the safety dog will oscillate and move the projections into and out of the stop-engaging attitude. The safety dog and weight combination is arranged to require a short interval of time to move projection 72 out of the stop-engaging attitude. If the platform is moving at a normal rate of speed, the combination will have sufficient time to move the projection out of the stop-engaging attitude, and the platform will move downward uninterruptedly. If the platform moves downward in excess of a predetermined rate of speed, the combination will not have sufficient time to move the projection out of the stop-engaging attitude, and the projection 72 will move into locking engagement with stop 19. The platform guide 20 will then be locked to the corner post. The driving means, however, will continue to operate until the tension in cable 36 is relaxed. The cable anchor 38 will then be pulled down until it engages the switch-actuating lever 48 and moves the lever out of engagement with switch 52. The switch 52 is biased to the "off" position and will move into that position and halt the operation of the driving means. The halting of the driving means maintains the platform in a substantially horizontal position. The safety mechanism will, therefore, halt the downward movement of the platform whenever the movement exceeds a predetermined rate of speed and will lock the platform in a substantially horizontal position.

Operators of lifts may by reason of their negligence allow a platform guide to stick or jam with a corner post, through the presence of a foreign body such as ice, a rag, rust, or through the absence of sufficient lubricant. In addition, operators may leave an obstruction under the lift. Where these things occur, one or more corners of the platform would stop its downward movement. If the lift was not equipped with a safety mechanism, the rest of the platform would continue to move and would cause a serious tilting of the platform. The safety mechanism disclosed by the invention will promptly halt the operation of the lift when one or more platform guides stick or jam. The platform guide will be halted but the driving means will pay out enough cable to relieve the tension in the cable. This will permit spring 44 to pull cable anchor 38 down until it moves switch-actuating lever 48 into the "off" position, thereby permitting the switch 52 to move into the "off" position and promptly halt the operation of the driving means. The prompt halting of the operation of the driving means will maintain the platform in a substantially horizontal position. In case the platform engages an obstruction, the safety mechanism will operate in the manner in which it operates when a corner of the platform sticks or binds. It can be seen that whenever the movement of one portion of the platform is halted, the movement of the rest of the platform will be halted, and the platform maintained in a substantially horizontal position.

Whereas a preferred form of the invention has been shown and described in the drawings and accompanying description, it is obvious to those skilled in the art that various changes and alterations may be made in the form of the invention without altering its scope.

What I claim is:

1. A safety mechanism for automobile lifts that have a platform on which an automobile may be supported, said safety mechanism being arranged to halt the downward movement of the platform promptly and positively and maintain the platform in a substantially horizontal position whenever the downward movement of the platform exceeds a predetermined rate of speed, said safety mechanism comprising an upstanding portion of the lift having stops thereon and a safety dog, said safety dog being carried and supported by the said platform and being arranged to be positively forced into a stop-engaging attitude by its engagement with the upstanding portion of the lift and to be moved out of the stop-engaging attitude by the action of gravity thereon whenever the downward movement of the platform is normal, and will remain in the stop-engaging attitude and be locked in engagement with one of the said stops whenever the downward movement of the platform exceeds a predetermined rate of speed.

2. A safety mechanism for automobile lifts that have a platform on which an automobile may be supported, said safety mechanism being arranged to halt the downward movement of the platform promptly and positively and maintain the platform in a substantially horizontal position whenever the downward movement of the platform exceeds a predetermined rate of speed, said safety mechanism comprising an upstanding portion of the lift having stops thereon, a safety dog, said safety dog being carried and supported by the said platform and being arranged to be positively forced into a stop-engaging attitude by its engagement with the upstanding portion of the lift and to be moved out of the stop-engaging attitude by the action of gravity thereon whenever the downward movement of the platform is normal, and will remain in the stop-engaging attitude and be locked in engagement with one of the said stops whenever the downward movement of the platform exceeds a predetermined rate of speed, and means to halt the operation of the driving means of the lift whenever the safety dog is locked in engagement with one of the said stops.

3. A safety mechanism for automobile lifts that have a platform on which an automobile may be supported, said safety mechanism being arranged to halt the downward movement of the platform promptly and positively and maintains the platform in a substantially horizontal position whenever the downward movement of the platform exceeds a predetermined rate of speed, said safety mechanism comprising an upstanding portion of the lift having stops thereon, a combination weight and safety dog, said combination weight and safety dog being carried and supported by the said platform and being arranged to be positively forced into a stop-engaging attitude by its engagement with the upstanding portion of the lift and to be moved out of the stop-engaging attitude by the action of gravity on the combination whenever the downward movement of the platform is normal, and will remain in the stop-engaging attitude and be locked in engagement with one of the said stops whenever the downward movement of the platform exceeds a predetermined rate of speed, and means to halt the operation of the driving means of the lift whenever the combination weight and safety dog is locked in engagement with one of the said stops.

4. A safety mechanism for automobile lifts that have a platform on which an automobile may be supported, said safety mechanism being arranged to halt the downward movement of the platform promptly and positively and maintain the platform in a substantially horizontal position whenever the downward movement of the platform exceeds a predetermined rate of speed, said safety mechanism comprising an upstanding portion of the lift having stops thereon, a safety dog carried and supported by the said platform and arranged to oscillate and move into and out of a stop-engaging attitude, said safety dog being moved into the stop-engaging attitude by its engagement with one of the said stops, said safety dog being moved out of the stop-engaging attitude by the action of gravity thereon whenever the downward movement of the platform is normal, said safety dog being arranged to remain in the stop-engaging attitude and be locked in engagement with one of the said stops whenever the downward movement of the platform exceeds a predetermined rate of speed, and electrical means to halt the operation of the driving means of the lift whenever the safety dog is locked in engagement with one of the said stops.

5. A safety mechanism for automobile lifts that have a platform on which an automobile may be supported, said safety mechanism being arranged to halt the downward movement of the platform promptly and positively and maintain the platform in a substantially horizontal position whenever the downward movement of the platform exceeds a predetermined rate of speed, said safety mechanism comprising an upstanding portion of the lift having stops thereon, a combination weight and safety dog carried and supported by the said platform and arranged to oscillate and move the safety dog into and out of a stop-engaging attitude, said safety dog being moved into the stop-engaging attitude by its engagement with one of the said stops, said safety dog being moved out of the stop-engaging attitude by the action of gravity on the combination whenever the downward movement of the platform is normal, said safety dog being arranged to remain in the stop-engaging attitude and be locked in engagement with one of the said stops whenever the downward movement of the platform exceeds a predetermined rate of speed, and electrical means to halt the operation of the driving means of the lift whenever the safety dog is locked in engagement with one of the said stops.

6. A safety mechanism for automobile lifts that have a platform on which an automobile may be supported, said safety mechanism being arranged to halt the downward movement of the platform promptly and positively and maintain the platform in a substantially horizontal position whenever the downward movement of the platform exceeds a predetermined rate of speed, said safety mechanism comprising an upstanding portion of the lift having stops thereon, a safety dog carried and supported by the said platform and arranged to oscillate and move into and out of a stop-engaging attitude, said safety dog having projections thereon, said safety dog being moved into the stop-engaging attitude by the engagement of one of the projections thereon with the said stops, said safety dog being moved out of the stop-engaging attitude by the action of gravity thereon whenever the downward movement of the platform is normal, said safety dog being arranged to remain in the stop-engaging attitude and have one of the projections thereon locked in engagement with one of the said stops whenever the downward movement of the platform exceeds a predetermined rate of speed, and electrical means to halt the operation of the driving means of the lift whenever the safety dog is locked in engagement with one of the said stops.

7. A safety mechanism for automobile lifts that have a platform on which an automobile may be supported, said safety mechanism being adapted to halt the downward movement of the platform promptly and positively, and maintain the platform in a substantially horizontal position whenever the downward movement of the platform exceeds a predetermined rate of speed, said safety mechanism comprising an upstanding portion of the lift having stops thereon, a safety dog pivotally supported by the platform, said safety dog having projections thereon that are arranged to engage the upstanding portion of the lift, said safety dog being arranged to move into and out of a stop-engaging attitude, said safety dog being biased to move out of the stop-engaging attitude, said engagement between the upstanding portion of the lift and the projections on the safety dog being arranged to cooperate with the biasing of the safety dog to cause the safety dog to oscillate and thereby move the projections thereon into and out of the stop-engaging attitude whenever the downward movement of the platform is normal, and to leave the safety dog in the stop-engaging attitude and thereby lock the platform to the lift whenever the downward movement of the lift exceeds a predetermined rate of speed, and electrical means to halt the operation of the driving means of the lift whenever the platform is locked to the lift.

8. A safety mechanism for automobile lifts that have a platform on which an automobile may be supported, said safety mechanism being adapted to halt the downward movement of the platform promptly and positively and maintain the platform in a substantially horizontal position whenever the downward movement of the platform exceeds a predetermined rate of speed, said safety mechanism comprising an upstanding portion of the lift having stops thereon, a safety dog that is pivotally secured to the platform of the lift, said safety dog having projections thereon that engage the said stops, said safety dog being arranged to move into and out of a stop-engaging attitude, said safety dog being biased to move relatively slowly out of the stop-engaging attitude, said safety dog being arranged to oscillate by reason of the engagement between said projections and said stops and by reason of the biasing of the safety dog and thereby move into and out of the stop-engaging attitude whenever the downward movement of the platform is normal, and being arranged to lock one of the projections on the safety dog in engagement with one of the said stops whenever the downward movement of the platform exceeds a predetermined rate of speed, an electric switch in the electrical circuit of the lift, a switch-actuating lever carried and supported by the platform, means to move said switch-actuating lever into the "off" position, and resilient means to move said switch into the "off" position whenever the switch-actuating lever moves into the "off" position, thereby causing the breaking of the electrical circuit of the lift whenever the projection on the safety dog is locked in locking engagement with one of the said stops.

9. A safety mechanism for lifts for raising motor vehicles that is adapted to halt the downward movement of the platform of the lift promptly and positively and maintain the platform in a substantially horizontal position whenever the downward movement of the platform exceeds a predetermined rate of speed, said safety mechanism comprising a safety dog that is oscillatably secured to the platform of the lift, projections on the safety dog that engage stops on an upstanding portion of the lift, a surface on the tops of the projections to successively engage the lower edges of the stops on the upstanding portion of the lift and thereby cause the safety dog to oscillate and move into and out of a stop-engaging attitude as the platform moves upwardly, a surface on the bottom of one of the said projections to engage the stops and positively force the safety dog into the stop-engaging attitude as the platform moves downwardly, said safety dog having its center of gravity eccentric to the center of oscillation thereof so that it moves the safety dog out of the stop-engaging attitude when the downward movement of the platform is normal and will leave the safety dog in the stop-engaging attitude and lock one of the projections in locking engagement with one of the said stops whenever the downward movement of the platform exceeds a predetermined rate of speed, and means to halt the operation of the driving means of the lift whenever the projection is in locking engagement with one of the said stops.

10. A safety mechanism for automobile lifts that have a cable supported platform on which an automobile may be supported, said safety mechanism being adapted to halt the movement of the platform promptly and positively and maintain the platform in a substantially horizontal position whenever the cable breaks or becomes slack, comprising an electric switch controlling the operation of the driving means of the lift, resilient means biasing the switch to the "off" position, a safety dog adapted to move into locking engagement with stops on an upstanding portion of the lift, and a switch-operating lever that is movable to permit the switch to move into the "off" position thereby halting the operation of the driving means of the lift, said switch-operating lever being arranged to be moved whenever the cable breaks or becomes slack.

11. A safety mechanism for automobile lifts that have a cable supported platform on which an automobile may be supported, said safety mechanism being adapted to halt the movement of the platform promptly and positively and maintain the platform in a substantially horizontal position whenever the cable breaks or becomes slack, comprising an electric switch controlling the operation of the driving means of the lift, resilient means biasing the switch to the "off" position, a safety dog having a projection thereon, said safety dog being adapted to move said projection into locking engagement with a stop on an upstanding portion of the lift, and a switch-operating lever that is movable to permit the switch to move into the "off" position thereby halting the operation of the driving means of the lift and to force the safety dog into locking engagement with one of the said stops, said switch-operating lever being arranged to be moved whenever the cable breaks or becomes slack.

12. A safety mechanism for automobile lifts that have a cable supported platform on which an automobile may be supported, said safety means being adapted to halt the movement of the platform promptly and positively and maintain the platform in a substantially horizontal position whenever the cable breaks or becomes slack, comprising an electric switch controlling the operation of the driving means of the lift, resilient means biasing the switch to the "off" position, a switch-operating lever that engages the said switch, resilient means holding said switch-operating lever and said switch in the "on" position, a cable anchor secured to said cable, said cable anchor being arranged to move and force the switch-operating lever into the "off" position, resilient means biasing said cable anchor toward the "off" position, a safety dog adapted to move into locking engagement with a stop on an upstanding portion of the lift, said cable anchor being arranged to move said switch-operating lever into engagement with the safety dog and thereby force the safety dog into locking engagement with one of the said stops, said cable anchor being arranged to move, thereby halting the operation of the driving means and forcing the safety dog into locking engagement with one of the said stops, whenever the cable breaks or becomes slack.

13. A safety mechanism for automobile lifts having a platform on which an automobile may be supported, said safety mechanism being adapted to halt the movement of the entire platform promptly and positively and main the platform in a substantially horizontal position whenever the movement of any portion of the platform is halted, comprising an electric switch controlling the operation of the driving means of the lift, resilient means biasing the switch to the "off" position, and means to permit the switch to move into the "off" position, thereby halting the operation of the driving means, whenever the movement of any portion of the platform is halted.

14. A safety mechanism for automobile lifts that have a cable supported platform on which an automobile may be supported, said safety mechanism being adapted to halt the movement of the entire platform promptly and positively and maintain the platform in a substantially horizontal position whenever the movement of any portion of the platform is halted, comprising an electric switch controlling the operation of the driving means of the lift, resilient means biasing the switch to the "off" position, a switch-operating lever that engages the said switch, resilient means holding said switch-operating lever and said switch in the "on" position, a cable anchor secured to said cable, said cable anchor being arranged to move and force the switch-operating lever into the "off" position, resilient means biasing said cable anchor to the "off" position, said cable anchor being arranged to move and force the switch-operating lever into the 'off" position thereby halting the operation of the driving means whenever the movement of any portion of the platform is halted.

15. A safety mechanism for automobile lifts that have a cable supported platform on which an automobile may be supported, said safety mechanism being adapted to halt the movement of the platform of the lift promptly and positively and maintain the platform in a substantially horizontal position whenever the movement of the platform exceeds a predetermined rate of speed or the cable breaks or becomes slack, said safety mechanism comprising a safety dog, an upstanding portion of the lift having stops thereon, and a member movable to positively lock the safety dog in locking engagement with one of the said stops and thereby prevent any movement of the platform relative to the lift, and means operable to move said member whenever the cable breaks or becomes slack, said safety dog being arranged to move into and out of a stop-engaging attitude whenever the downward movement of the platform is normal and to remain in the stop-engaging attitude and be locked in engagement with one of the said stops whenever the downward movement of the platform exceeds a predetermined speed.

16. A safety mechanism for automobile lifts that have a cable supported platform on which an automobile may be supported, said safety mechanism being adapted to halt the movement of the platform of the lift promptly and positively and maintain the platform in a substantially horizontal position whenever the movement of the platform exceeds a predetermined rate of speed or the cable breaks or becomes slack, said safety mechanism comprising a safety dog, an upstanding portion of the lift having stops thereon, and a member movable to positively lock the safety dog in locking engagement with one of the said stops and thereby prevent any movement of the platform relative to the lift, means operable to move said member whenever the cable breaks or becomes slack, said safety dog being arranged to move into and out of a stop-engaging attitude whenever the downward movement of the platform is normal and to remain in the stop-engaging attitude and be locked in engagement with one of the said stops whenever the downward movement of the platform exceeds a predetermined rate of speed, and means to halt the operation of the driving means of the lift whenever the safety dog is locked in locking engagement with one of the said stops.

17. A safety mechanism for automobile lifts that have a platform on which an automobile may be supported, said safety mechanism comprising an upstanding portion of the lift having stops thereon and a safety dog, said safety dog being carried and supported by the said platform and being arranged to be positively forced into a stop-engaging attitude by its engagement with the upstanding portion of the lift and to be moved out of the stop-engaging attitude by the action of gravity thereon whenever the downward movement of the platform is normal, and will remain in the stop-engaging attitude and be locked in engagement with one of the said stops whenever the downward movement of the platform exceeds a predetermined rate of speed, said locking of the safety dog in locking engagement with a stop serving to halt the downward movement of the platform.

EDWIN H. STEEDMAN.